(12) United States Patent
Evans et al.

(10) Patent No.: US 7,484,426 B2
(45) Date of Patent: Feb. 3, 2009

(54) MULTIPHASIC OVERREADING CORRECTION IN A PROCESS VARIABLE TRANSMITTER

(75) Inventors: Russell N. Evans, Louisville, CO (US); John E. Garnett, Boulder, CO (US)

(73) Assignee: Rosemount Inc., Eden Prairie, MN (US)

( * ) Notice: Subject to any disclaimer, the term of this patent is extended or adjusted under 35 U.S.C. 154(b) by 18 days.

(21) Appl. No.: 11/706,135

(22) Filed: Feb. 14, 2007

(65) Prior Publication Data

US 2007/0193369 A1    Aug. 23, 2007

Related U.S. Application Data

(60) Provisional application No. 60/773,581, filed on Feb. 15, 2006.

(51) Int. Cl.
*G01F 1/37* (2006.01)
*G06F 19/00* (2006.01)

(52) U.S. Cl. ..................... 73/861.52; 702/50
(58) Field of Classification Search .............. 73/861.52; 702/50–55
See application file for complete search history.

(56) References Cited

U.S. PATENT DOCUMENTS

| | | | | |
|---|---|---|---|---|
| 5,051,922 A | | 9/1991 | Toral et al. ................. | 364/510 |
| 5,969,266 A | | 10/1999 | Mahoney et al. ......... | 73/861.65 |
| 6,151,557 A | * | 11/2000 | Broden et al. ................. | 702/47 |
| 6,470,755 B1 | | 10/2002 | Beachey et al. ............... | 73/756 |
| 6,961,624 B2 | * | 11/2005 | Kirkpatrick et al. ........... | 700/19 |
| 7,258,024 B2 | | 8/2007 | Dimarco et al. .......... | 73/861.22 |
| 7,293,471 B2 | | 11/2007 | Lund Bo et al. ......... | 73/861.52 |

FOREIGN PATENT DOCUMENTS

| | | |
|---|---|---|
| GB | 2 221 042 | 1/1990 |
| GB | 2 411 476 | 8/2005 |
| WO | WO 99/10712 | 3/1999 |
| WO | WO 02/08702 | 1/2002 |

OTHER PUBLICATIONS

Rosemount, "Rosemount Compact Orifice Flowmeter Series." Oct. 2004. pp. 1-3 and 15-22. Acessed online Apr. 29, 2008. <http://www.pro-techsolutionsltd.com/PDF/405%20compact.pdf>.*

Geng et al., "Study of metering characteristics of a slotted orifice for wet gas flow". Flow Measurement and Instrumentation vol. 17 (2006), pp. 123-128. Available online Sep. 21, 2005. Acessed online Apr. 29, 2008. <http://www.sciencedirect.com/>.*

(Continued)

*Primary Examiner*—Edward Lefkowitz
*Assistant Examiner*—Jonathan Dunlap
(74) *Attorney, Agent, or Firm*—Christopher R. Christenson; Westman, Champlin & Kelly, P.A.

(57) ABSTRACT

A process variable transmitter is operably coupleable to a source of multiphasic process fluid flow. The process variable transmitter is configured to obtain information relative to temperature, a reference pressure, and differential pressure across a differential pressure producer in the multiphasic process flow. The process variable transmitter is configured to calculate and/or correct for overreading based upon the reference pressure, the differential pressure and the temperature.

12 Claims, 4 Drawing Sheets

OTHER PUBLICATIONS

Rosemount, "Rosemount 3095 MV MultiVariable Mass Flow Transmitter" Aug. 2004. Access online Apr. 29, 2008. <http://www.pro-techhsolutionsltd.com/PDF/3095mv.pdf>.*

Official Search Report and Written Opinion from foreign application No. PCT/US2007/003747 filed Feb. 14, 2007.

Rosemount, "Reference Manual—Rosemount 3095 MultiVariable Mass flow Transmitter with Hart or Foundation Fieldbus Protocol," Emerson Process Management, May 2005.

Rosemount, "Produktdatenblatt—Rosemount Durchflussmessgerate mit Kompaktmessblende," Emerson Process Management, Apr. 2005.

Rosemount, "White Paper—Rosemount Conditioning Orifice Plate in 'Wet Gas,'" Emerson Process Management, 2005.

Rosemount, "Wet Gas Flow Measurement with Conditioning Orifice Meter Flow Test Data Book and Flow Handbook," Reference Manual 00821-0200-4810, Rev AA, Feb. 2006.

"Handbook of Multiphase Flow Metering," NFOGM/Tekna Revision 2, Mar. 2005.

International Search Report and Written Opinion in foreign application No. PCT/US2007/001405 filed Jan. 18, 2007.

* cited by examiner

MULTIPHASIC OVERREADING CORRECTION IN A PROCESS VARIABLE TRANSMITTER

CROSS-REFERENCE TO RELATED APPLICATION

The present application is based on and claims the benefit of U.S. provisional patent application Ser. No. 60/773,581, filed Feb. 15, 2006, the content of which is hereby incorporated by reference in its entirety.

BACKGROUND

In many process installations, a process fluid flows through a conduit, such as process piping. The process fluid may be a liquid, a gas, or a combination of the two. In applications where the process fluid is completely liquid, or completely gas, the calculation of flow parameters, such as mass flow is relatively straightforward. However, in applications where the process fluid is a combination of a liquid and a gas, the calculation of flow parameters is more difficult. Examples of process fluids that generally have a liquid intermingled with a gas (e.g. multiphasic) include wet steam, and natural gas.

In many natural gas well head applications, there is a substantial amount of liquid entrained in the gas stream. The presence of this liquid can cause significant errors in the gas flow measurement. One type of error is sometimes called overreading. Overreading occurs when the differential pressure sensor overreads the true gas flow. The amount of overreading is often correlated to the Lockhart Martinelli parameter, a number that relates the total gas mass flow to the total liquid mass flow. While it may be possible to measure many parameters, and utilize powerful processors to compute flow parameters, such calculations have typically involved dedicated hardware, dedicated technician time and/or testing, or a combination of the two.

Process fluid control installations generally employ process variable transmitters. Providing such a process variable transmitter with the ability to correct for overreading, without adding additional hardware, or involving complex initial characterization or calibration of the device would represent a significant benefit.

SUMMARY

A process variable transmitter is operably-coupleable to a source of multiphasic process fluid flow. The process variable transmitter is configured to obtain information relative to temperature, a reference pressure, and differential pressure across a differential pressure producer in the multiphasic process flow. The process variable transmitter is configured to calculate and/or correct for overreading based upon the reference pressure, the differential pressure and the temperature.

DETAILED DESCRIPTION OF ILLUSTRATIVE EMBODIMENTS

Figure 1:
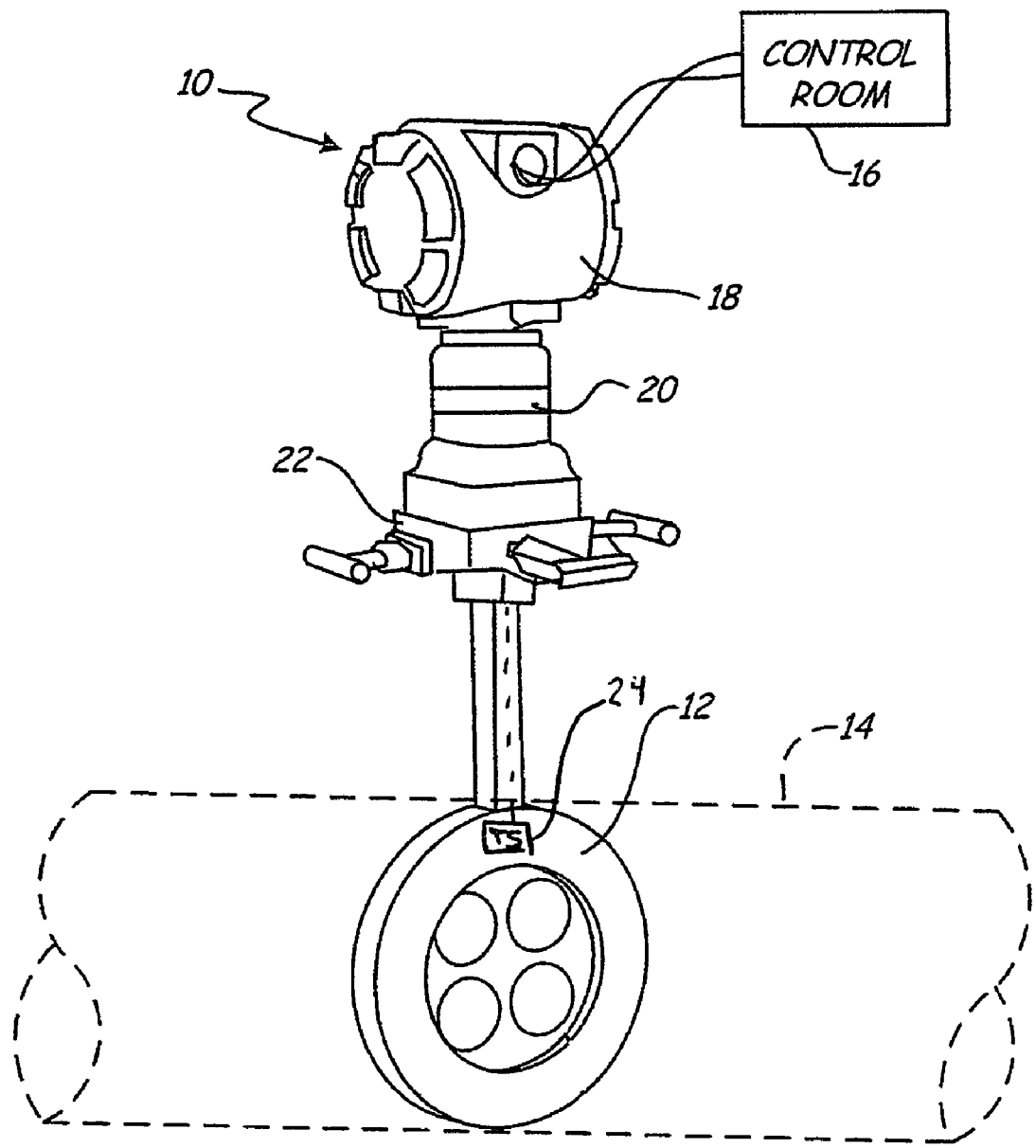
FIG. 1 is a diagrammatic view of a multivariable multiphasic fluid flow transmitter in accordance with an embodiment of the present invention.

FIG. 1 is a diagrammatic view of a multivariable differential pressure transmitter 10 coupled to a differential pressure producer 12 within piping 14. Transmitter 10 is operably coupled to control room 16 using any suitable connection, including wired or wireless connections. Examples of suitable wired connections include the Highway Addressable Remote Transducer (HART®) protocol, the FOUNDATION™ Fieldbus Protocol, or other protocols. Additionally, or alternatively, wireless data transmission protocols can also be employed. In some wired embodiments, transmitter 10 is able to be wholly powered by energy received through the wired process communication lines through which it communicates.

Multivariable transmitter 10 includes electronics compartment 18, coupled to sensor module 20 which is further coupled to manifold 22. Manifold 22 couples sensor module 20 to differential pressure producer 12. Ports on opposite sides of producer 12, convey both upstream and downstream process fluid pressures to manifold 22. Manifold 22 isolates the process fluid from sensor module 20, but conveys both the upstream and downstream process fluid pressures to a differential pressure sensor disposed within sensor module 20.

Transmitter 10 is considered a field device in that it is generally able to be mounted in the field. The "field" is generally an external area in a process installation that may be subject to climatological extremes, vibration, changes in humidity, electromagnetic or radio frequency interference, or other environmental challenges. Thus, the robust physical package of process pressure transmitter 10 provides pressure transmitter 10 with the ability to operate in the "field" for extended periods (such as years) at a time.

In this embodiment, multivariable transmitter 10 is considered "multivariable" in that it is able to transduce a plurality of process variables. For example, as described above, transmitter 10 senses differential pressure produced across producer 12. Additionally, transmitter 10 is coupled to temperature sensor 24 and is adapted to measure a temperature of the process fluid via sensor 24. Sensor 24 is preferably embedded within producer 12 and may be of any suitable design including a Resistance Temperature Device (RTD), a thermocouple, a thermistor, or any other suitable technology. Preferably, sensor 24 is disposed within a thermowell inside producer 12. Additionally, as will be described in greater detail with respect to FIG. 2, multivariable transmitter 10 is also able to measure a reference (absolute or gage) pressure of process fluid within piping 14. There is experimental evidence that the amount of overreading of a differential pressure transmitter is a function of operating pressure, gas velocity, and geometry of differential pressure elements. Transmitter 10, by virtue of its ability to transduce multiple parameters, can acquire all of these pieces of information either in a stored meter configuration file, measured process variables, or through calculations. A method for providing an improved gas flow rate correction will be described in greater detail with respect to FIG. 4.

Figure 2:
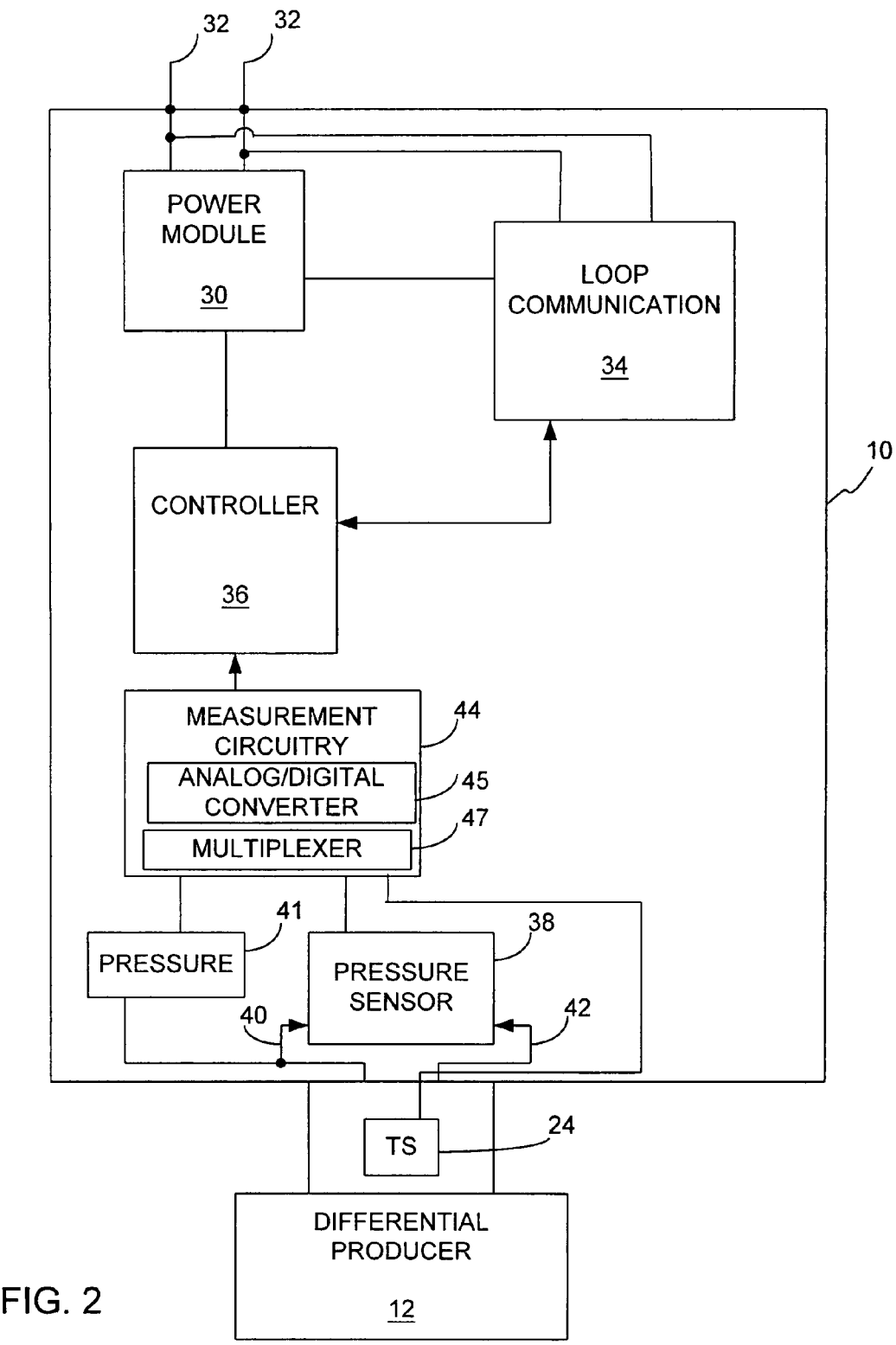
FIG. 2 is a block diagram of a multivariable multiphasic process fluid transmitter in accordance with an embodiment of the present invention.

FIG. 2 is a block diagram of multivariable transmitter 10 in accordance with an embodiment of the present invention. Transmitter 10 includes power module 30 operably coupled to process communication loop 32. Transmitter 10 preferably includes loop communication module 34 which is also operably coupleable to process communication loop 32. Loop communication module 34 is configured to provide signaling in accordance with a particular process industry standard protocol, such as the HART® protocol or FOUNDATION™ Fieldbus Protocol. Transmitter 10 includes controller 36 which preferably includes a low-power microprocessor. Controller 36 receives power from power module 30 and communicates bi-directionally with loop communication module 34.

Differential pressure producer 12 is operably coupled to differential pressure sensor 38 via impulse lines 40 and 42. In one embodiment, differential pressure sensor 38 generally includes a movable membrane that moves in response to differential pressure within lines 40 and 42. Differential pressure sensor 38 can include a conductive diaphragm that forms a capacitor with respective plates on either side of the diaphragm. Thus, as the conductive diaphragm moves, the capacitance changes and such change can be used to indicate differential pressure. Other forms of differential pressure sensors can also be used for differential pressure sensor 38. Suitable examples include strain gauge-based sensors, piezoresistive-based sensors, or others.

Differential pressure sensor 38 is electrically coupled to measurement circuitry 44 which is configured to measure the changing electrical characteristic of differential pressure sensor 38. Measurement circuitry 44 preferably includes analog-to-digital converter 45 and multiplexer 47. Analog-to-digital converter 45 is operably coupled to pressure sensors 38, 41 and temperature sensor 24 and provides digital indications to controller 36 based upon the electrical characteristics of pressure sensors 38, 41 and temperature sensor 24.

Pressure sensor 41 is operably coupled to one of impulse lines 40 and 42. In FIG. 2, pressure sensor 41 is operably coupled to impulse line 40. Pressure sensor 41 is a reference pressure sensor in that is either a gage, atmospheric, or absolute pressure sensor that is able to provide an indication of pressure within impulse line 40, which is representative of the pressure within process piping 14. The provision of additional pressure sensor 41 in addition to differential pressure sensor 38 allows multivariable transmitter 10 to measure not only differential pressure across producer 12, but also a reference pressure within the process piping. While FIG. 2 illustrates a differential pressure sensor 38 and an absolute pressure sensor 41, other arrangements can be used to sense both differential and a reference pressure. For example, a pair of reference pressure sensors that could be used where each respective reference pressure sensor is coupled to an impulse line. Thus, each pressure sensor measures the reference pressure value of the pressure within the impulse line, and then differential pressure is calculated as the arithmetic difference of the two measurements. Measurement circuitry 44 employs multiplexer 47, which selectively couples one of pressure sensor 41, pressure sensor 38, or temperature sensor 24 to analog-to-digital converter 45. Analog-to-digital converter 45 then generates a digital indication related to an analog electrical quantity presented by an associated sensor. In embodiments where multiple analog-to-digital converters 45 are used, multiplexer 47 may potentially be omitted.

FIG. 2 also illustrates measurement circuitry 44 being coupled to temperature sensor 24. As set forth above, temperature sensor 24 can take any suitable form. The ability of multivariable transmitter 10 to sense differential and reference pressures relative to multiphasic process fluid flowing within piping 14, as well as the temperature of fluid within piping 14 enables higher level calculations with respect to the multiphasic fluid flow.

Figure 3:
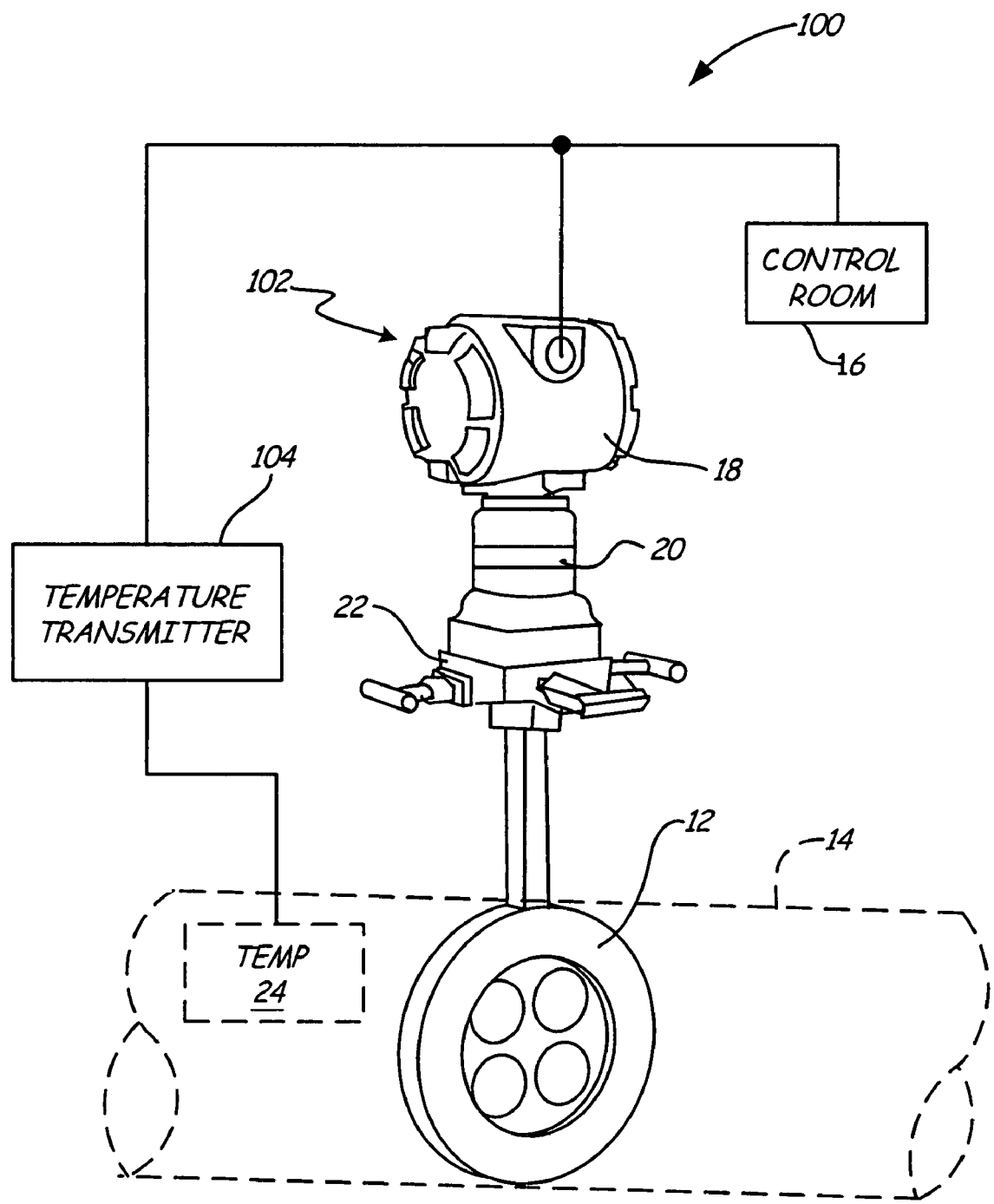
FIG. 3 is a diagrammatic view of a process measurement system for providing multiphasic process fluid flow information in accordance with an embodiment of the present invention.

FIG. 3 is a diagrammatic view of process measurement system in accordance with an embodiment of the present invention. System 100 includes differential pressure transmitter 102 and temperature transmitter 104. FIG. 3 illustrates that embodiments of the present invention can utilize the ability of additional process variable transmitters to communicate process variable information to a particular process device, such as differential pressure process variable transmitter 102, thereby allowing differential pressure transmitter 102 to calculate a corrected multiphasic fluid parameter. In the embodiment illustrated in FIG. 3, transmitter 102 is coupled to differential pressure producer 12 and bears many similarities to multivariable transmitter 10 described with respect to FIGS. 1 and 2. Like components are numbered similarly. Additionally, system 100 includes process temperature transmitter 104 coupled to temperature sensor 24 illustrated in phantom illustrated in FIG. 3. Process temperature transmitters are known in the art, and accordingly transmitter 104 will not be described in greater detail. In accordance with an embodiment of the present invention, transmitter 102 queries or otherwise obtains process fluid temperature information from temperature transmitter 104. Transmitter 102 then transduces differential and reference pressures and provides corrected multiphasic fluid flow parameters. Additionally, embodiments of the present invention also include the utilization of yet another process transmitter to transduce, or otherwise measure the pressure within piping 14.

In accordance with one embodiment of the present invention, the controller of the process variable transmitter, such as controller 36, calculates the corrected multiphasic fluid flow values using what are commonly referred to as function blocks, wherein each function block is a part (e.g., a subroutine) of an overall control routine and operates in conjunction with other function blocks (via communications called links) to implement process control loops within the process control system. Function blocks typically perform one of an input function, such as that associated with a process variable transmitter, a sensor or other process parameter measurement device, a control function, such as that associated with a control routine that performs PID, fuzzy logic control, or an output function which controls the operation of some device, such as a valve, to perform some physical function within the process control system. Of course hybrid and other types of function blocks exist. Function blocks may be stored in and executed by the controller of the process device, which is typically the case when such function blocks are used for, or associated with, standard 4-20 mA devices and some types of smart field devices such as HART devices or may be stored in and implemented by field devices themselves, which can be the case with FOUNDATION™ Fieldbus.

Figure 4:
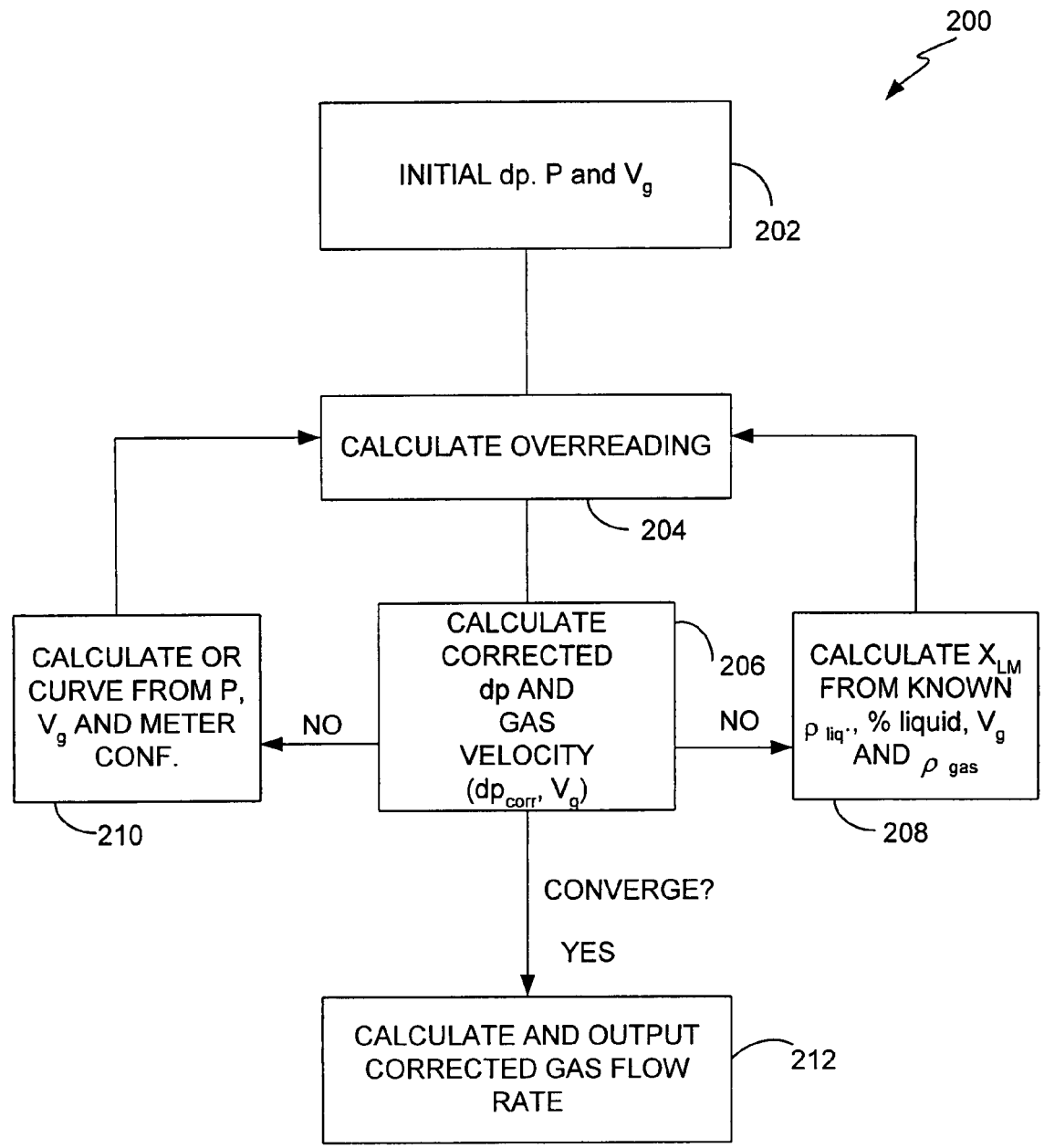
FIG. 4 is a flow diagram of a method for calculating a gas flow rate for a multiphasic process fluid flow in accordance with an embodiment of the present invention.

FIG. 4 is a flow diagram of a method for calculating and correcting a gas flow rate parameter for a multiphasic process fluid flow in accordance with an embodiment of the present invention. Method 200 begins at block 202 where initial values of differential pressure (dp), reference pressure (P), and gas velocity ($V_g$) are obtained. As set forth above, these parameters can be transduced by suitable sensors coupled to a multivariable process device as described above with respect to FIGS. 1 and 2; obtained from one or more other field devices via process communication; or a combination of the two. Control then proceeds to block 204 where overreading (OR) is calculated. This calculation is based on the measured or otherwise obtained values for pressure (P) and gas velocity ($V_g$). Block 204 calculates overreading based upon the pressure and gas velocity values obtained in block 202. There is experimental evidence that the amount of overreading is a function of the operating pressure, gas velocity, and geometry of the differential pressure primary element. The geometry of the differential pressure primary element 12 is known once the installation and/or commissioning of field device is performed. Accordingly, that information is considered a priori information relative to operation. However, each of transmitters 10, 102 maintains information related to differential pressure primary element (producer) 12 in memory. This information can be in the form of a set of coefficients for an equation, a lookup table, or any other suitable form. One particular relationship between overreading and the Lockhart Martinelli parameter ($X_{LM}$) is the linear overreading model. In the linear overreading model, the slope of a plot of overreading versus $X_{LM}$ is equal to an intercept plus a first coefficient multiplied by the pressure value (P) plus a second coefficient multiplied by the velocity of gas, plus a third coefficient multiplied by a value indicative of the differential pressure producer geometry. More specifically, this relationship takes the format of the following:

Slope of $OR$=Intercept+$C1(P)$+$C2(V_g)$+$C3$ ($\beta$) vs. $X_{LM}$

For the initial calculation of overreading performed at block 204, the Lockhart Martinelli parameter can be estimated using a suitable default value, or retrieved as an initial value entered during the commissioning of the multiphasic fluid flow transmitter. Once the initial calculation of overreading is performed at block 204, both the differential pressure value and the gas velocity values are calculated based upon the overreading value calculated in block 204. Calculation of differential pressure and gas velocity is performed at block 206. Block 206 also includes a test that determines whether or not the corrected differential pressure is sufficiently close to a corrected differential pressure obtained in a previous iteration. Essentially, this is a convergence test. On the first pass through, there will be no convergence and block 206 will simply pass control to blocks 208 and 210 to calculate the Lockhart Martinelli parameter, and overreading curve, respectively, from the parameters calculated in block 206.

At block 208, the Lockhart Martinelli parameter ($X_{LM}$) which is defined as:

$$X_{LM} = \frac{Q_l}{Q_g}\sqrt{\frac{\rho_g}{\rho_l}}$$

Where:
$Q_l$ is the mass flow rate of liquid
$Q_g$ is the mass flow rate of gas
$\rho_l$ is the flowing density of the liquid
$\rho_g$ is the flowing density of the gas Is calculated from the known density of the liquid, the percent of the liquid present in the multiphasic fluid flow, and the density of the gas. The density of the liquid is preferably entered as a priori information during the commissioning, or maintenance of the multiphasic fluid flow meter based upon the anticipated process liquid(s) that will be present in piping 14. The gas density is calculated based on the known properties of the gas phase in the piping 14 and the measured process temperature and pressure. The ratio of liquid and gas phase mass flow rates is assumed to be constant and is measured independently, either by using a test separator or other means.

In block 210, the overreading curve is calculated, or otherwise determined, based upon the pressure measured in block 202, the gas velocity calculated in block 206 and known meter configuration information. Both the calculated Lockhart Martinelli parameter and the calculated overreading curve are fed back to block 204 and the method iterates with the newly calculated information from blocks 208 and 210. This process continues until the differential pressure converges to a suitable degree, at which time control passes from block 206 to block 212. At block 212, the differential pressure is used to calculate the corrected gas flow rate for the multiphasic fluid flow. This parameter is preferably communicated to a controller, or other suitable process device, via a process communication loop, such as loop 32.

Embodiments of the present invention provide a significant benefit to the multiphasic process fluid flow industry. Process variable transmitters, which are already used in a number of process installations, can now provide valuable multiphasic process fluid information even as flow conditions change.

Although the present invention has been described with reference to preferred embodiments, workers skilled in the art will recognize that changes may be made in form and detail without departing from the spirit and scope of the invention.

What is claimed is:

1. A method for providing a corrected flow parameter in a multiphasic process fluid flowmeter, the method comprising:
    obtaining a differential pressure value relative to differential pressure across a differential pressure producer disposed in piping conveying a multiphasic process fluid;
    obtaining a reference pressure value relative to the multiphasic process fluid;
    obtaining a temperature value relative to the multiphasic process fluid;
    obtaining a gas velocity of the multiphasic process fluid;
    calculating an overreading value based upon the differential pressure and the gas velocity;
    correcting the differential pressure based upon the overreading value; and
    determining if the differential pressure has converged by a selected amount and iterating if it has not converged;
    calculating a Lockhart-Martinelli parameter based upon known liquid density, a percentage of liquid in the fluid, the calculated gas velocity and a density of the gas;
    obtaining an overreading relationship based upon the reference pressure, the temperature, the gas velocity, and producer geometry information; and
    providing a multiphasic fluid flow value based upon the differential pressure once the differential pressure has converged by the selected amount, but feeding the Lockhart-Martinelli parameter and the overreading relationship back if the differential pressure has not converged by the selected amount,
    wherein at least one of the differential pressure value, the reference pressure value and the temperature value is communicated to the flowmeter through a process communication loop.

2. The method of claim 1, wherein obtaining the differential pressure value includes employing a differential pressure sensor operably coupled to a differential pressure producer disposed within the multiphasic process fluid.

3. The method of claim 1, wherein obtaining the reference pressure value includes employing a pressure sensor operably coupled to the multiphasic process fluid.

4. The method of claim 1, wherein obtaining the temperature includes employing a temperature sensor operably coupled to the multiphasic process fluid.

5. A method for providing a corrected flow parameter in a multiphasic process fluid flowmeter, the method comprising:
    obtaining a differential pressure value relative to differential pressure across a differential pressure producer disposed in piping conveying a multiphasic process fluid;
    obtaining a reference pressure value relative to the multiphasic process fluid;

obtaining a temperature value relative to the multiphasic process fluid;

obtaining a gas velocity of the multiphasic process fluid;

calculating an overreading value based upon the differential pressure and the gas velocity;

correcting the differential pressure based upon the overreading value; and determining if the differential pressure has converged by a selected amount and iterating if it has not converged;

calculating a Lockhart-Martinelli parameter based upon known liquid density, a percentage of liquid in the fluid, the calculated gas velocity and a density of the gas;

obtaining an overreading relationship based upon the reference pressure, the temperature, the gas velocity, and producer geometry information; and providing a multiphasic fluid flow value based upon the differential pressure once the differential pressure has converged by the selected amount, but feeding the Lockhart-Martinelli parameter and the overreading relationship back if the differential pressure has not converged by the selected amount, wherein the method is performed within a function block.

6. The method of claim 5, wherein obtaining the differential pressure value includes employing a differential pressure sensor operably coupled to a differential pressure producer disposed within the multiphasic process fluid.

7. The method of claim 5, wherein obtaining the reference pressure value includes employing a pressure sensor operably coupled to the multiphasic process fluid.

8. The method of claim 5, wherein obtaining the temperature includes employing a temperature sensor operably coupled to the multiphasic process fluid.

9. A method for providing a corrected flow parameter in a multiphasic process fluid flowmeter, the method comprising:

obtaining a differential pressure value relative to differential pressure across a differential pressure producer disposed in piping conveying a multiphasic process fluid;

obtaining a reference pressure value relative to the multiphasic process fluid;

obtaining a temperature value relative to the multiphasic process fluid;

obtaining a gas velocity of the multiphasic process fluid;

calculating an overreading value based upon the differential pressure and the gas velocity;

correcting the differential pressure based upon the overreading value; and determining if the differential pressure has converged by a selected amount and iterating if it has not converged;

calculating a Lockhart-Martinelli parameter based upon known liquid density, a percentage of liquid in the fluid, the calculated gas velocity and a density of the gas;

obtaining an overreading relationship based upon the reference pressure, the temperature, the gas velocity, and producer geometry information; and providing a multiphasic fluid flow value based upon the differential pressure once the differential pressure has converged by the selected amount, but feeding the Lockhart-Martinelli parameter and the overreading relationship back if the differential pressure has not converged by the selected amount, and further comprising completely powering the multiphasic process fluid flowmeter with a process communication loop.

10. The method of claim 9, wherein obtaining the differential pressure value includes employing a differential pressure sensor operably coupled to a differential pressure producer disposed within the multiphasic process fluid.

11. The method of claim 9, wherein obtaining the reference pressure value includes employing a pressure sensor operably coupled to the multiphasic process fluid.

12. The method of claim 9, wherein obtaining the temperature includes employing a temperature sensor operably coupled to the multiphasic process fluid.

* * * * *